United States Patent
Hsu

(10) Patent No.: US 8,666,002 B2
(45) Date of Patent: Mar. 4, 2014

(54) RECEIVER FOR COMPENSATING I/Q MISMATCH, COMPENSATION DEVICE, COMPENSATION MODULE AND COMPENSATION PARAMETER CALCULATING MODULE

(75) Inventor: Hong-Ta Hsu, Hsinchu (TW)

(73) Assignee: Realtek Semiconductor Corp., Hsinchu (TW)

(*) Notice: Subject to any disclaimer, the term of this patent is extended or adjusted under 35 U.S.C. 154(b) by 0 days.

(21) Appl. No.: 13/401,277

(22) Filed: Feb. 21, 2012

(65) Prior Publication Data
US 2012/0213317 A1 Aug. 23, 2012

(30) Foreign Application Priority Data
Feb. 22, 2011 (TW) .............................. 100105780 A

(51) Int. Cl.
*H04B 1/10* (2006.01)
*H04B 1/00* (2006.01)

(52) U.S. Cl.
USPC .......................................... 375/346; 375/130

(58) Field of Classification Search
USPC ................. 375/346, 130, 260, 267, 296, 350; 455/101, 132
See application file for complete search history.

(56) References Cited

U.S. PATENT DOCUMENTS

| 6,892,060 B2 | 5/2005 | Zheng |
| 2006/0120487 A1* | 6/2006 | Nakao et al. .................. 375/334 |
| 2012/0096061 A1* | 4/2012 | Hauske ........................ 708/319 |

OTHER PUBLICATIONS

Ediz Cetin et al., "Adaptive self-calibrating image rejection receiver", IEEE International Conference on Communications, 2004, pp. 2731-2735.
Imtinan Elani et al., "I/Q Mismatch Compensation Using Adaptive Decorrelation in a Low-IF Receiver in 90-nm CMOS Process," IEEE Journal of Solid-State Circuits, Feb. 2006, pp. 395-404, vol. 41, No. 2.

* cited by examiner

*Primary Examiner* — Khai Tran
(74) *Attorney, Agent, or Firm* — The Webb Law Firm

(57) ABSTRACT

A receiver for compensating I/Q mismatch includes an analog down-conversion unit for receiving a radio frequency signal and down-converting the RF signal into a set of digital low intermediate frequency (IF) signals, a digital down-conversion unit receiving the set of digital low IF signals and down-converting the set of digital low IF signals into first and second baseband signals, and a compensation unit. The compensation unit receives the first and second baseband signals, calculates a compensation parameter based thereon, and compensates I/Q mismatch effect according to the first and second baseband signals and the compensation parameter so as to output a target signal.

17 Claims, 5 Drawing Sheets

RECEIVER FOR COMPENSATING I/Q MISMATCH, COMPENSATION DEVICE, COMPENSATION MODULE AND COMPENSATION PARAMETER CALCULATING MODULE

CROSS-REFERENCE TO RELATED APPLICATION

This application claims priority of Taiwanese Application No. 100105780, filed on Feb. 22, 2011.

BACKGROUND OF THE INVENTION

1. Field of the Invention

The present invention relates to a low intermediate frequency receiver, a compensation device, a compensation module and a compensation parameter calculating module, more particularly to a receiver, a compensation device, a compensation module and a compensation parameter calculating module for compensating I/Q mismatch.

2. Description of the Related Art

I/Q mismatch includes characteristics of gain mismatch and phase imbalance. Referring to FIG. 1 and FIG. 2, a waveform plot of a radio frequency (RF) signal, which is received by a conventional low intermediate frequency (IF) receiver, includes a target signal 91 and an interference signal 92. The RF signal shown in FIG. 1 is down-converted from a RF band into a low IF signal 90 shown in FIG. 2, wherein, the low IF signal 90 includes a positive frequency low IF signal having a frequency of $f_{IF}$, and a negative frequency low IF signal having a frequency of $-f_{IF}$. Owing to influence resulting from I/Q mismatch, the target signal 91 may mix with the interference signal 92 during down-conversion processing such that the target signal 91 is vulnerable to interference.

In a conventional technology, after a RF mixer down-converts the RF signal, a polyphase filter is usually used for lowering power of the negative frequency low IF signal to be substantially equal to power of the positive frequency low IF signal, and providing signals filtered by the polyphase filter to analog-to-digital converters (ADC) in two I/Q paths. In this way, bit numbers required for performing subsequent analog-to-digital conversion may be reduced.

For solving a problem that the target signal 91 is interfered resulting from I/Q mismatch effect, a prior art for compensating I/Q mismatch effect is disclosed in "Adaptive self-calibrating image rejection receiver" published in International Conference on Communications (ICC) by Ediz Cetin et al., 2004. However, this prior art compensates I/Q mismatch effect by means of a digital image rejection processor (DIRP), and therefore the positive frequency low IF signal and the negative frequency low IF signal resulting from down-conversion processing of the RF signal must have symmetric characteristics. In other words, a scheme of the prior art is only suitable for a receiver including a low-pass filter (LPF) but not a receiver including a polyphase filter.

Another prior art is disclosed in "I/Q Mismatch Compensation Using Adaptive Decorrelation in a Low-IF Receiver in 90-nm CMOS Process" published in IEEE journal of Solid-State Circuits (JSSC) by Imtinan Elahi et al., 2006. This prior art achieves an object of compensating I/Q mismatch effect by means of a complex multiplier. However, similar to the prior art disclosed by Ediz Cetin et al., the positive frequency low IF signal and the negative frequency low IF signal must have the symmetric characteristics. Thus, a scheme of this prior art may not be applicable to the receiver including the polyphase filter.

A compensating technology for I/Q mismatch effect applicable to a polyphase filter scheme is disclosed in U.S. Pat. No. 6,892,060. However, this technology compensates I/Q mismatch effect in an analog manner after down-conversion, and therefore an analog multiplier is required. Nevertheless, accuracy of the analog multiplier has inferior performance compared with that of a digital multiplier, and controllability thereof is not as convenient as utilizing a digital multiplier, such that a higher design cost of the low IF receiver is incurred.

SUMMARY OF THE INVENTION

Therefore, in a first aspect of the present invention, a receiver is provided that is capable of compensating I/Q mismatch, that is adapted for receiving a radio frequency (RF) signal, and that comprises:

an analog down-conversion unit for receiving the RF signal, down-converting the RF signal into a set of analog low IF signals, and converting the set of analog low IF signals into a set of digital low IF signals;

a digital down-conversion unit coupled to the analog down-conversion unit for receiving the set of digital low IF signals, down-converting the set of digital low IF signals into a set of digital low frequency (LF) signals, and converting the set of digital LF signals into a first baseband signal and a second baseband signal, respectively; and a compensation unit coupled to the digital down-conversion unit, and including:
  a time domain-frequency domain transforming module receiving the first and second baseband signals, and transforming each of the first and second baseband signals into a respective one of a first frequency domain baseband signal and a second frequency domain baseband signal;
  a compensation parameter calculating module receiving the first and second frequency domain baseband signals and calculating a compensation parameter based thereon; and
  a compensation module receiving the first and second baseband signals and the compensation parameter, calculating a product of the second baseband signal and the compensation parameter, and outputting a target signal according to a difference between the first baseband signal and the product calculated thereby.

Furthermore, in a second aspect of the present invention, a compensation device for a low IF receiver is provided. The compensation device is for receiving a first baseband signal and a second baseband signal resulting from down-conversion processing of an RF signal. The compensation device comprises:

a time domain-frequency domain transforming module for receiving the first and second baseband signals, and transforming each of the first and second baseband signals into a respective one of a first frequency domain baseband signal and a second frequency domain baseband signal;

a compensation parameter calculating module receiving the first and second frequency domain baseband signals and calculating a compensation parameter based thereon; and a compensation module receiving the first and second baseband signals and the compensation parameter, calculating a product of the second baseband signal and the compensation parameter, and outputting a target signal according to a difference between the first baseband signal and the product calculated thereby.

Moreover, in a third aspect of the present invention, a compensation module is provided. The compensation module is for receiving a first baseband signal, a second baseband signal and a compensation parameter. The first baseband signal and the second baseband signal resulted from down-conversion processing of an RF signal. The compensation module comprises:

a multiplier calculating a product of the second baseband signal and the compensation parameter; and a subtractor receiving the product calculated by the multiplier and calculating a difference between the first baseband signal and the product.

Additionally, in a fourth aspect of the present invention, a compensation parameter calculating module is provided. The compensation parameter calculating module is for receiving a first frequency domain baseband signal and a second frequency domain baseband signal resulting from down-conversion processing of an RF signal. The compensation parameter calculating module comprises:

a first multiplier calculating a first product of the second frequency domain baseband signal and a training parameter;

an error processor calculating a difference value between the first frequency domain baseband signal and the first product, and determining whether the difference value is smaller than a threshold value; and a training parameter generator calculating an updated value of the training parameter according to the difference value and a conjugate of the second frequency domain baseband signal.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
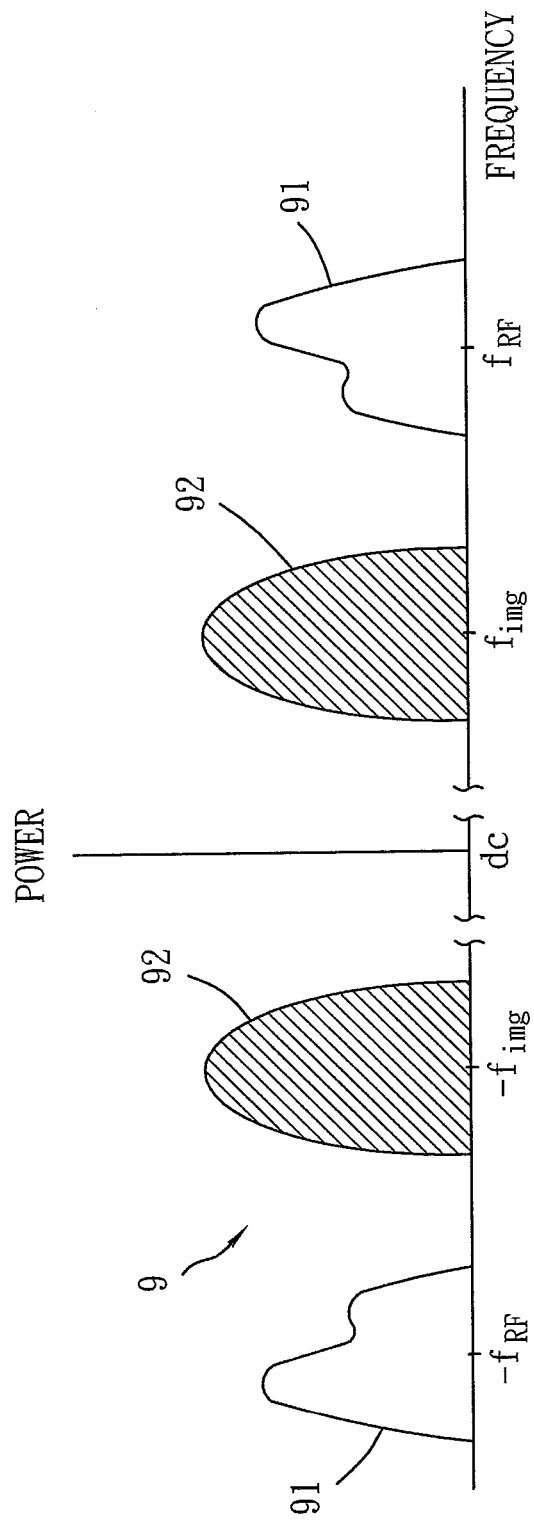
FIG. 1 is a waveform plot of a radio frequency signal including a target signal and an interference signal.
Figure 2:
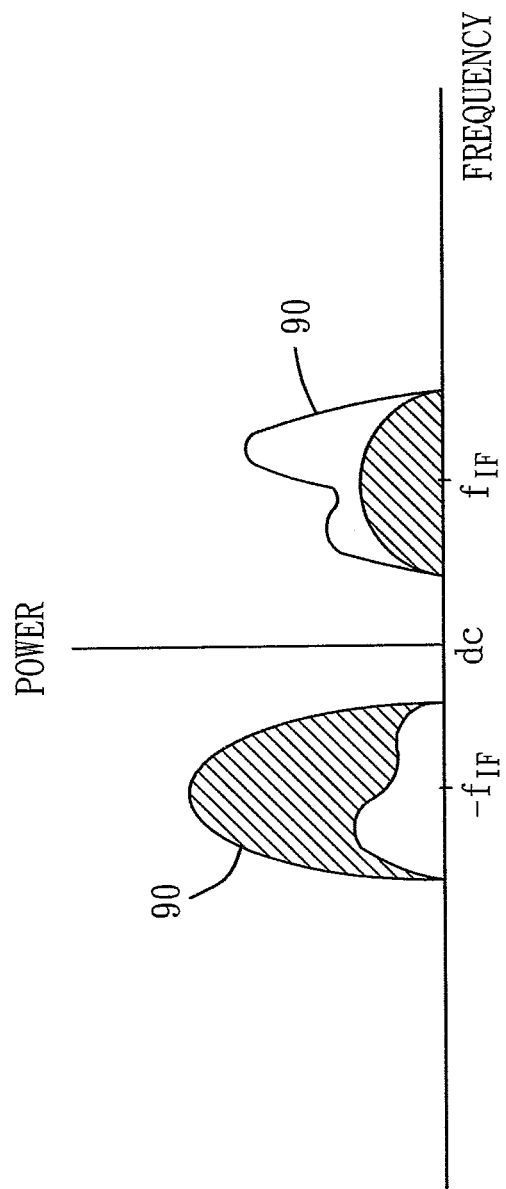
FIG. 2 is a waveform plot of a low intermediate frequency (IF) signal including a positive frequency low IF signal and a negative frequency low IF signal.
Figure 3:
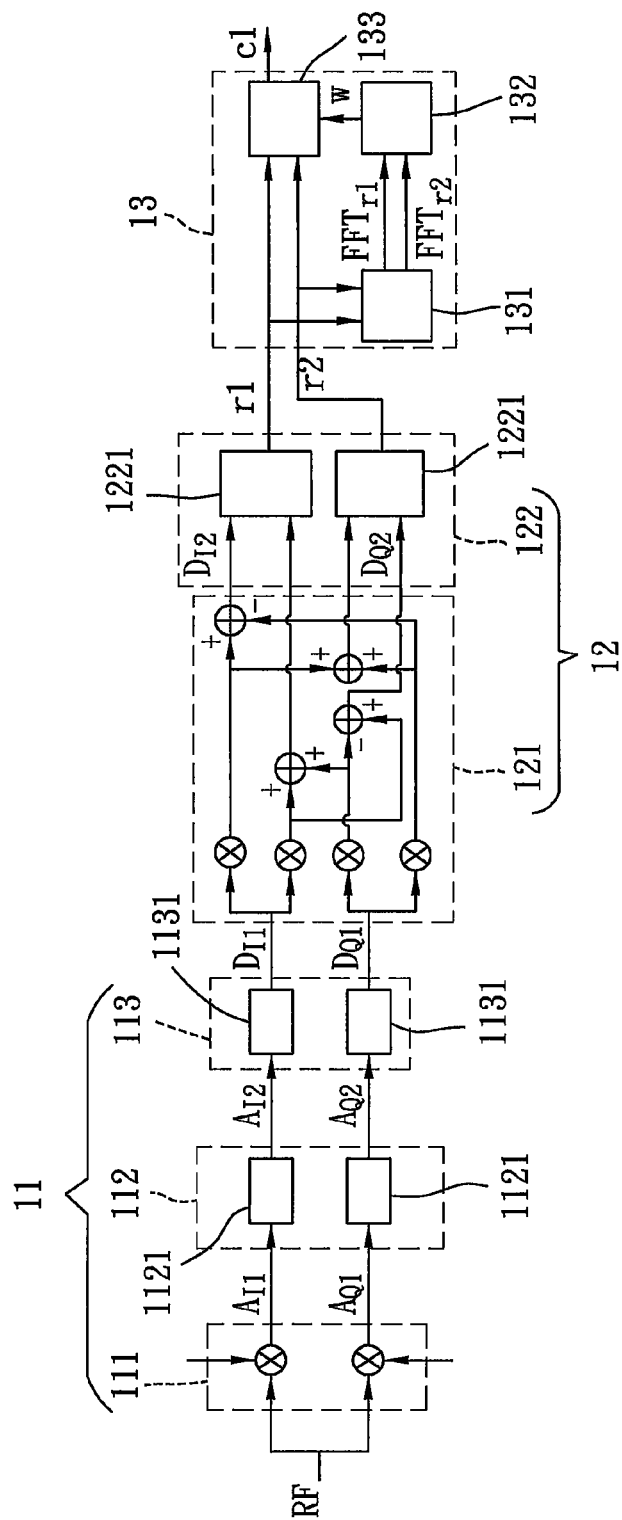
FIG. 3 is a block diagram of a preferred embodiment of a receiver according to the present invention.

Referring to FIG. 3, a preferred embodiment of a receiver for compensating I/Q mismatch according to the present invention is illustrated. This preferred embodiment includes an analog down-conversion unit 11, a digital down-conversion unit 12 and a compensation unit 13.

The analog down-conversion unit 11 includes an analog RF mixer module 111, an analog filter module 112 and an analog-to-digital converter module 113. The analog RF mixer module 111 receives a radio frequency (RF) signal and down-converts the RF signal into a set of analog low intermediate frequency (IF) signals. The set of analog low IF signals includes an in-phase analog low IF signal $A_{I1}$ and a quadrature analog low IF signal $A_{Q1}$. The analog filter module 112 receives the set of analog low IF signals, generates a set of adjusted analog low IF signals through lowering power of the negative frequency component of low IF complex signal $A_{I1}+j*A_{Q1}$ at a frequency of $-f_{IF}$ to be substantially much lower than power of the positive frequency component of analog low IF complex signal $A_{I1}+j*A_{Q1}$ at a frequency of $f_{IF}$, and transmits the set of adjusted analog low IF signals to the analog-to-digital converter module 113. The analog-to-digital converter module 113 converts the set of adjusted analog low IF signals into a set of digital low IF signals including an in-phase digital low IF signal $D_{I1}$ and a quadrature digital low IF signal $D_{Q1}$.

The analog filter module 112 includes two first filters 1121 each receiving a respective one of the in-phase analog low IF signal $A_{I1}$ and the quadrature analog low IF signal $A_{Q1}$, and each outputting a corresponding one of a filtered in-phase analog low IF signal $A_{I2}$ and a filtered quadrature analog low IF signal $A_{Q2}$. That is, the set of adjusted analog low IF signals includes the filtered in-phase analog low IF signal $A_{I2}$ and the filtered quadrature analog low IF signal $A_{Q2}$. The analog-to-digital converter module 113 includes two analog-to-digital converters 1131 each converting a respective one of the filtered in-phase analog low IF signal $A_{I2}$ and the filtered quadrature analog low IF signal $A_{Q2}$ into a corresponding one of the in-phase digital low IF signal $D_{I1}$ and the quadrature digital low IF signal $D_{Q1}$.

The digital down-conversion unit 12 includes a digital down-conversion mixer module 121 and a digital filter module 122. The digital down-conversion mixer module 121 receives the set of digital low IF signals, down-converts the set of digital low IF signals into a set of digital low frequency (LF) signals, and transmits the set of digital LF signals to the digital filter module 122. The set of digital LF signals includes a positive frequency digital LF signal $D_{I2}$ and a negative frequency digital LF signal $D_{Q2}$. The digital filter module 122 receives the set of digital LF signals and converts the set of digital LF signals into a set of baseband signals. The set of baseband signals includes a first baseband complex signal r1 and a second baseband complex signal r2.

In this embodiment, the digital down-conversion mixer module 121 receives the in-phase digital low IF signal $D_{I1}$ and the quadrature digital low IF signal $D_{Q1}$, and outputs the positive frequency digital LF signal $D_{I2}$ and the negative frequency digital LF signal $D_{Q2}$ resulting from down-conversion processing. The digital filter module 122 includes two second filters 1221 each receiving a respective one of the positive frequency digital LF signal $D_{I2}$ and the negative frequency digital LF signal $D_{Q2}$, and each outputting a corresponding one of the first baseband signal r1 and the second baseband signal r2.

The compensation unit 13 is coupled to the digital down-conversion unit 12, and includes a time domain-frequency domain transforming module 131, a compensation parameter calculating module 132 and a compensation module 133. The time domain-frequency domain transforming module 131 receives the first baseband signal r1 and the second baseband signal r2, and transforms each of the first and second baseband signals r1, r2 into a respective one of a first frequency domain baseband signal $FFT_{r1}$ and a second frequency domain baseband signal $FFT_{r2}$. The compensation parameter calculating module 132 receives the first frequency domain baseband signal $FFT_{r1}$ and the second frequency domain baseband signal $FFT_{r2}$, and calculates a compensation parameter w based thereon. Preferably, the time domain-frequency domain transforming module 131 is a fast Fourier transformer (FFT). Preferably, a one-point FFT is adopted for realizing the time domain-frequency domain transforming module 131 so as to reduce an overall size of the preferred embodiment and to cut down costs.

Figure 4:
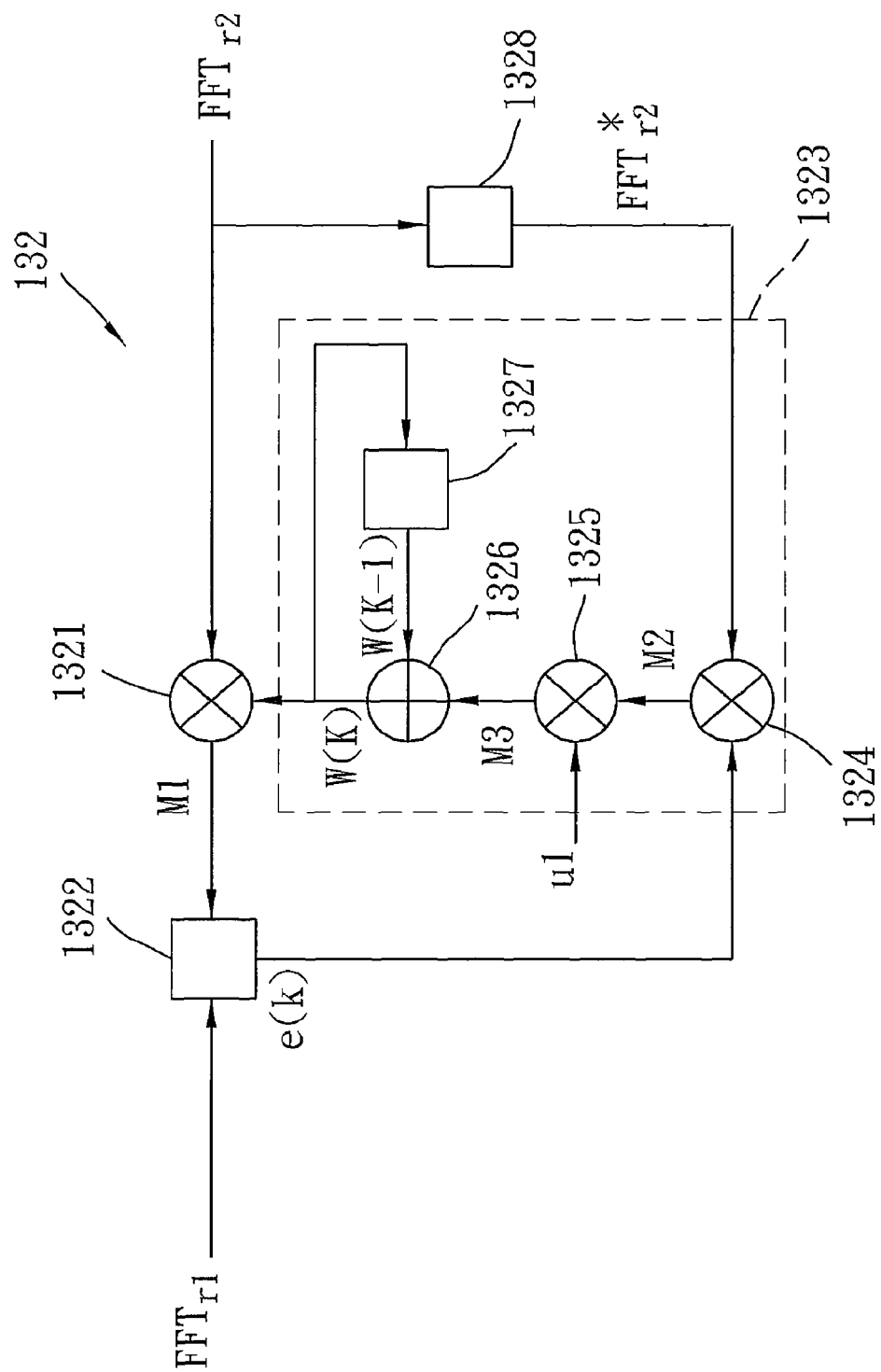
FIG. 4 is a schematic diagram illustrating a compensation parameter calculating module of the preferred embodiment.

Referring to FIG. 4, an embodiment of the compensation parameter calculating module 132 is shown. The compensation parameter calculating module 132 includes a first multiplier 1321, an error processor 1322 and a training parameter generator 1323. The training parameter generator 1323 includes a second multiplier 1324, a third multiplier 1325, an adder 1326 and a delayer 1327. The compensation parameter calculating module 132 further includes a conjugate calculator 1328, in which the conjugate calculator 1328 calculates a conjugate of the second frequency domain baseband signal $FFT_{r2}^*$. In other configurations of this embodiment, the conjugate calculator 1328 may alternatively be disposed in the time domain-frequency domain transforming module 131 such that the first frequency domain baseband signal $FFT_{r1}$, the second frequency domain baseband signal $FFT_{r2}$, and a conjugate of the second frequency domain baseband signal $FFT_{r2}^*$ are all provided by the time domain-frequency domain transforming module 131.

The first multiplier 1321 calculates a first product M1 of the second frequency domain baseband signal $FFT_{r2}$ and a training parameter W(K), and outputs the first product M1 to the error processor 1322. The error processor 1322 calculates a difference value e(k) between the first frequency domain baseband signal $FFT_{r1}$ and the first product M1. The second multiplier 1324 receives the difference value e(k), and calculates a second product M2 of the conjugate of the second frequency domain baseband signal $FFT_{r2}^*$ and the difference value e(k) calculated by the error processor 1322. The third multiplier 1325 calculates a third product M3 of the second product M2 and a preset constant u1. The adder 1326 calculates an updated value of the training parameter W(K) as the sum of the third product M3 and a current value of the training parameter W(K−1) which results from delaying the updated value of the training parameter W(K) by the delayer 1327. Subsequently, the first multiplier 1321 once again calculates an updated value of the first product M1 of the second frequency domain baseband signal $FFT_{r2}$ and the updated value of the training parameter W(K). The error processor 1322 calculates an updated value of the difference value e(k) between the first frequency domain baseband signal $FFT_{r1}$ and the updated value of the first product M1. The updated value of the training parameter W(K) serves as the compensation parameter w when the error processor 1322 determines that the updated value of the difference value e(k) is smaller than a threshold value. Otherwise, the aforementioned procedures are repeated so as to update the training parameter W(K) and the difference value e(k) when the error processor 1322 determines that the updated value of the difference value e(k) is larger than the threshold value.

It should be noted that the compensation parameter calculating module 132 may alternatively be realized through computer program processing so as to calculate the compensation parameter w by means of least mean squares (LMS) algorithm or sign-sign algorithm. The aforementioned illustration is merely one embodiment of the compensation parameter calculating module 132, and the invention is not limited to the disclosure of this embodiment.

Figure 5:
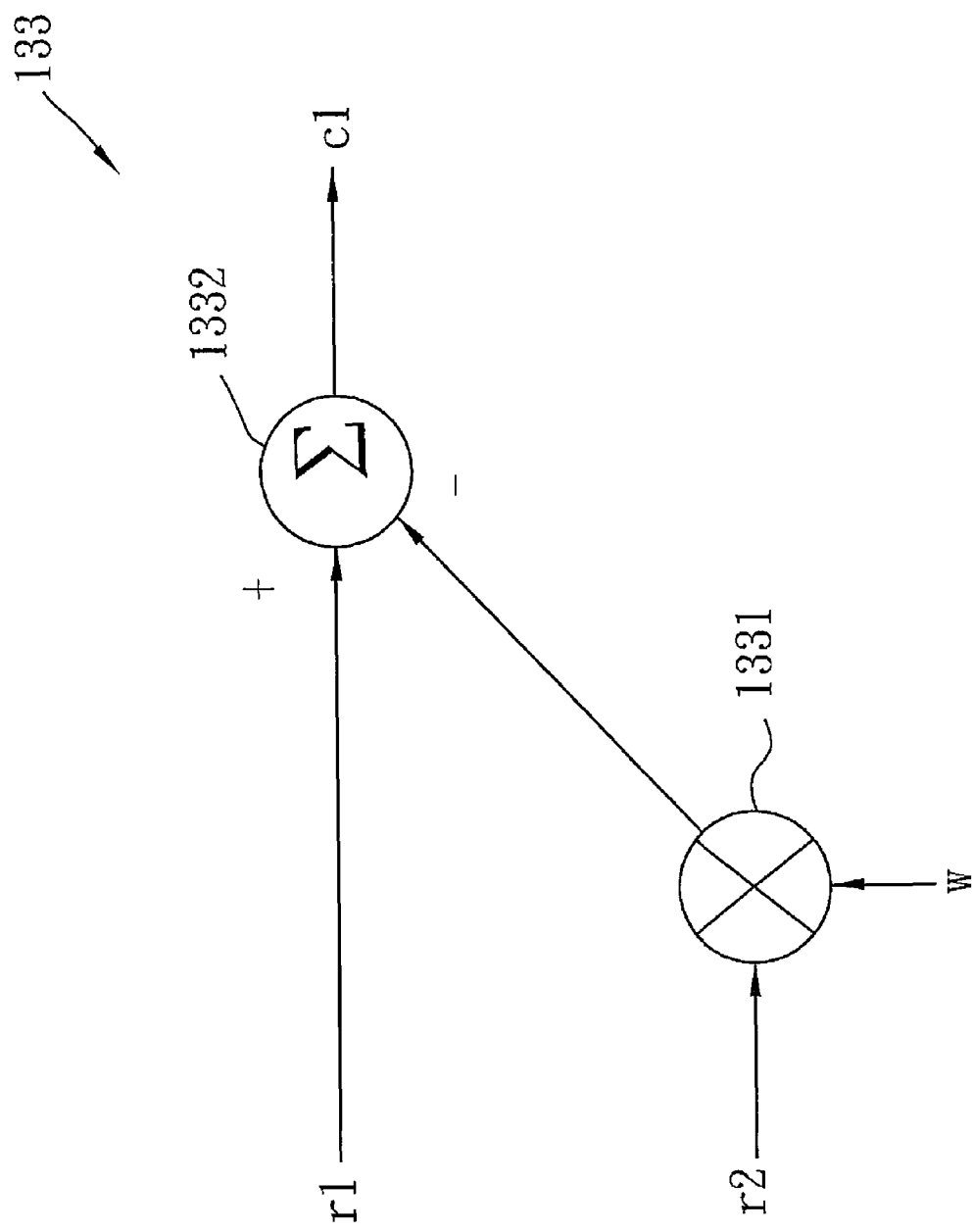
FIG. 5 is a schematic diagram illustrating a compensation module of the preferred embodiment.

Referring to FIG. 5, an embodiment of the compensation module 133 is illustrated. The compensation module 133 receives the first baseband signal r1, the second baseband signal r2 and the compensation parameter w, and calculates a target signal c1 through the following steps:

The compensation module 133 includes a fourth multiplier 1331 and a subtractor 1332. The fourth multiplier 1331 calculates a product of the second baseband signal r2 and the compensation parameter w, and transmits the product to the subtractor 1332. The subtractor 1332 calculates the difference between the first baseband signal r1 and the product received from the fourth multiplier 1331 so as to obtain the target signal c1 which is not influenced by interference signals. The target signal c1 satisfies:

$$c1 = r1 - r2 * w \tag{F.1}$$

In the preferred embodiment, the compensation module 133 is not designed in a symmetric style. Therefore, each of the first filters 1121 of the analog filter module 112 of the preferred embodiment may have the freedom of adopting one of a low-pass filter scheme and a polyphase filter scheme. Furthermore, the compensation module 133 may alternatively be realized through computer program processing so as to compensate I/Q mismatch and calculate the target signal c1 according to the aforementioned equation (F.1). The aforementioned illustration is merely one embodiment of the compensation module 133, and the invention is not limited to the disclosure of this embodiment. Preferably, a single tone pulse having a frequency between an RF frequency $f_{RF}$ and an IM frequency $f_{IF}$ is adopted as the RF signal, wherein when the single tone pulse is down-converted into the IM, the frequency thereof is at $-f_{IF}$.

In summary, since the receiver of the present invention may effectively compensate I/Q mismatch effect in a digital way, design cost thereof may be effectively reduced compared with that of the prior art. In the meantime, since the first baseband signal r1 and the second baseband signal r2 received by the compensation module 133 of the present invention may not necessarily have the symmetric characteristic, the first filters 1121 in the analog filter module 112 may be realized using polyphase filters. Therefore, compared with the prior art, the present invention may not only compensate I/Q mismatch effect but may also effectively reduce the bit numbers required for analog-to-digital conversion so as to significantly cut down design cost.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A receiver for compensating I/Q mismatch, said receiver comprising:
   an analog down-conversion unit for receiving a radio frequency (RF) signal, down-converting the RF signal into a set of analog low intermediate frequency (IF) signals, and converting the set of analog low IF signals into a set of digital low IF signals;
   a digital down-conversion unit coupled to said analog down-conversion unit, down-converting the set of digital low IF signals into a set of digital low frequency (LF) signals, and converting the set of digital LF signals into a first baseband signal and a second baseband signal, respectively; and
   a compensation unit coupled to said digital down-conversion unit, and including:
      a time domain-frequency domain transforming module receiving the first and second baseband signals, and transforming each of the first and second baseband signals into a respective one of a first frequency domain baseband signal and a second frequency domain baseband signal;
      a compensation parameter calculating module receiving the first and second frequency domain baseband signals and calculating a compensation parameter based thereon; and a compensation module receiving the first and second baseband signals and the compensation parameter, calculating a product of the second baseband signal and the compensation parameter, and outputting a target signal according to a difference between the first baseband signal and the product calculated thereby.

2. The receiver as claimed in claim 1, wherein said compensation module includes a multiplier and a subtractor, said multiplier calculating the product of the second baseband signal and the compensation parameter, and outputting the product to said subtractor, said subtractor obtaining the difference between the first baseband signal and the product received from said multiplier.

3. The receiver as claimed in claim 1, wherein said compensation parameter calculating module includes:
   a first multiplier calculating a first product of the second frequency domain baseband signal and a training parameter;
   an error processor calculating a difference value between the first frequency domain baseband signal and the first product, and determining whether the difference value is smaller than a threshold value; and
   a training parameter generator calculating an updated value of the training parameter according to the difference value and a conjugate of the second frequency domain baseband signal.

4. The receiver as claimed in claim 3, wherein said training parameter generator includes:
   a second multiplier calculating a second product of the conjugate of the second frequency domain baseband signal and the difference value calculated by said error processor;
   a third multiplier calculating a third product of the second product and a preset constant; and
   an adder calculating the updated value of the training parameter as the sum of the third product and a current value of the training parameter.

5. The receiver as claimed in claim 1, wherein said analog down-conversion unit includes:
   an analog RF mixer module receiving the RF signal and down-converting the RF signal into the set of analog low IF signals;
   an analog filter module receiving the set of analog low IF signals, and generating a set of adjusted analog low IF signals through adjusting peak power of the set of analog low IF signals; and
   an analog-to-digital converter module receiving the set of adjusted analog low IF signals, and converting the set of adjusted analog low IF signals into the set of digital low IF signals.

6. The receiver as claimed in claim 1, wherein said digital down-conversion unit includes:
   a digital down-conversion mixer module receiving the set of digital low IF signals, and down-converting the set of digital low IF signals into the set of digital LF signals; and
   a digital filter module receiving the set of digital LF signals and converting the set of digital LF signals into the first baseband signal and the second baseband signal.

7. The receiver as claimed in claim 1, wherein the RF signal is a single tone pulse.

8. A compensation device for a low intermediate frequency (IF) receiver, said compensation device for receiving a first baseband signal and a second baseband signal resulting from down-conversion processing of a radio frequency (RF) signal, said compensation device comprising:
   a time domain-frequency domain transforming module for receiving the first and second baseband signals, and transforming each of the first and second baseband signals into a respective one of a first frequency domain baseband signal and a second frequency domain baseband signal;
   a compensation parameter calculating module receiving the first and second frequency domain baseband signals and calculating a compensation parameter based thereon; and
   a compensation module receiving the first and second baseband signals and the compensation parameter, calculating a product of the second baseband signal and the compensation parameter, and outputting a target signal according to a difference between the first baseband signal and the product calculated thereby.

9. The compensation device as claimed in claim 8, wherein said compensation module includes a multiplier and a subtractor, said multiplier calculating the product of the second baseband signal and the compensation parameter, and outputting the product to said subtractor, said subtractor obtaining the difference between the first baseband signal and the product received from said multiplier.

10. The compensation device as claimed in claim 8, wherein said compensation parameter calculating module includes:
    a first multiplier calculating a first product of the second frequency domain baseband signal and a training parameter;
    an error processor calculating a difference value between the first frequency domain baseband signal and the first product, and determining whether the difference value is smaller than a threshold value; and
    a training parameter generator calculating an updated value of the training parameter according to the difference value and a conjugate of the second frequency domain baseband signal.

11. The compensation device as claimed in claim 10, wherein said training parameter generator includes:
    a second multiplier calculating a second product of the conjugate of the second frequency domain baseband signal and the difference value calculated by said error processor;
    a third multiplier calculating a third product of the second product and a preset constant; and
    an adder calculating the updated value of the training parameter; and
    wherein the updated value of the training parameter is the sum of the third product and a current value of the training parameter.

12. The compensation device as claimed in claim 8, wherein the RF signal is a single tone pulse.

13. A compensation module for receiving a first baseband signal, a second baseband signal and a compensation parameter, the first baseband signal and the second baseband signal resulting from down-conversion processing of a radio frequency (RF) signal, said compensation module comprising:
    a multiplier calculating a product of the second baseband signal and the compensation parameter; and
    a subtractor receiving the product calculated by said multiplier and calculating a difference between the first baseband signal and the product.

14. The compensation module as claimed in claim 13, wherein the RF signal is a single tone pulse.

15. A compensation parameter calculating module for receiving a first frequency domain baseband signal and a second frequency domain baseband signal resulting from down-conversion processing of a radio frequency (RF) signal, said compensation parameter calculating module comprising:
- a first multiplier calculating a first product of the second frequency domain baseband signal and a training parameter;
- an error processor calculating a difference value between the first frequency domain baseband signal and the first product, and determining whether the difference value is smaller than a threshold value; and
- a training parameter generator calculating an updated value of the training parameter according to the difference value and a conjugate of the second frequency domain baseband signal.

16. The compensation parameter calculating module as claimed in claim 15, wherein said training parameter generator includes:
- a second multiplier calculating a second product of the conjugate of the second frequency domain baseband signal and the difference value calculated by said error processor;
- a third multiplier calculating a third product of the second product and a preset constant; and
- an adder calculating the updated value of the training parameter; and
- wherein the updated value of the training parameter is the sum of the third product and a current value of the training parameter.

17. The compensation parameter calculating module as claimed in claim 15, wherein the RF signal is a single tone pulse.

* * * * *